C. G. BROWNELL.
RAKE CONTROL FOR BUCK RAKES.
APPLICATION FILED NOV. 13, 1912.

1,162,129.

Patented Nov. 30, 1915.
3 SHEETS—SHEET 1.

WITNESSES:

INVENTOR
Cyril G. Brownell
BY
ATTORNEY

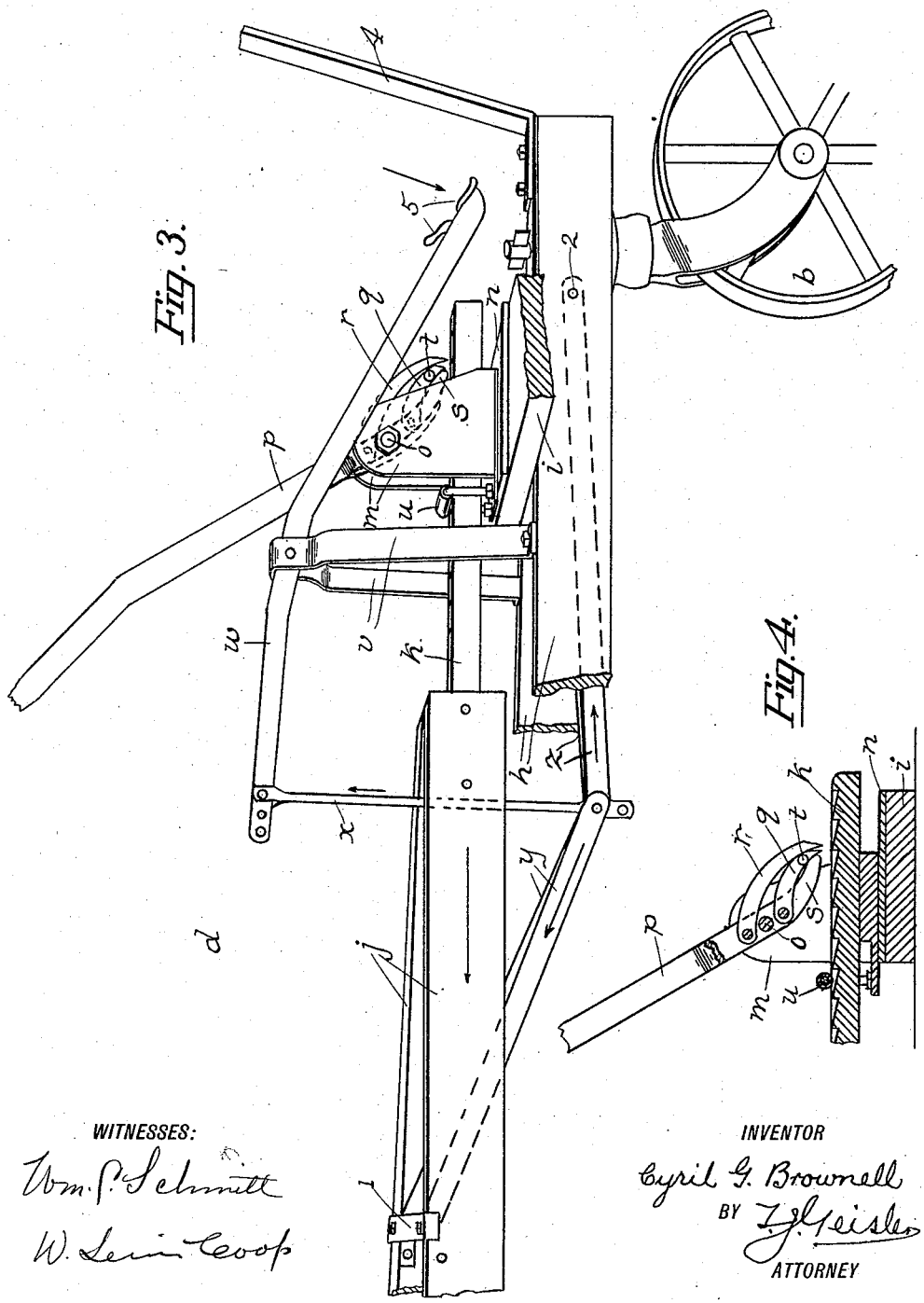

UNITED STATES PATENT OFFICE.

CYRIL G. BROWNELL, OF UMATILLA, OREGON.

RAKE CONTROL FOR BUCK-RAKES.

1,162,129.

Specification of Letters Patent.

Patented Nov. 30, 1915.

Application filed November 13, 1912. Serial No. 731,209.

*To all whom it may concern:*

Be it known that I, CYRIL G. BROWNELL, a citizen of the United States, and a resident of Umatilla, county of Umatilla, State of Oregon, have invented a new and useful Improvement in Rake Control for Buck-Rakes, of which the following is a specification.

My invention relates to improvements in buck rakes, thus referring to a well known type of rake used by farmers in transporting hay direct from the windrows to a stacker machine, instead of going through the intermediate process of arranging the hay in cocks and then pitching same on a wagon. Said buck rakes are provided with long, projecting horn-like teeth, which are positioned in front of the horses and which run longitudinally under the windrows until a sufficient load has been raked, upon which it will be carried to a stacker.

In the present form of buck rake one of the objectionable features is that movements of the rake teeth, due to irregularities of the ground over which said teeth run, are transmitted to the controlling lever, thereby making the actions of the latter dangerous to the operator. Another objectionable feature is that the teeth will not bear continually against the ground at all times.

One of the main objects of my invention is the elimination of said objectionable features, and providing more effective means for controlling said teeth than those in present use, also providing means for quickly and conveniently releasing the teeth when dropping the load.

Figure 1:
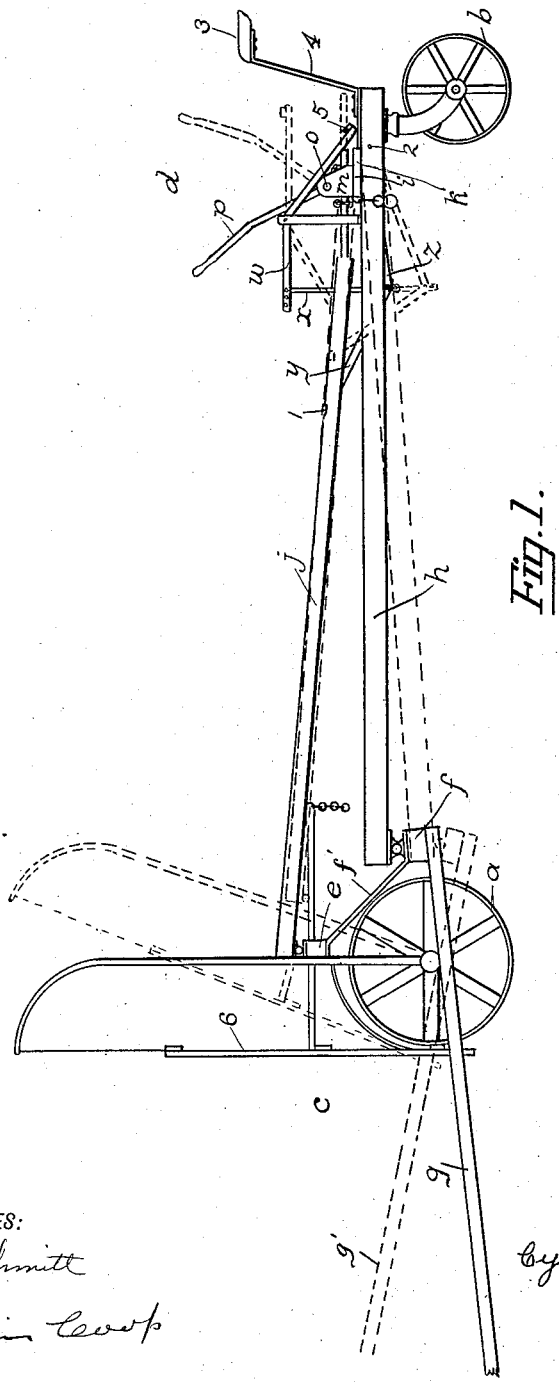
Figure 2:
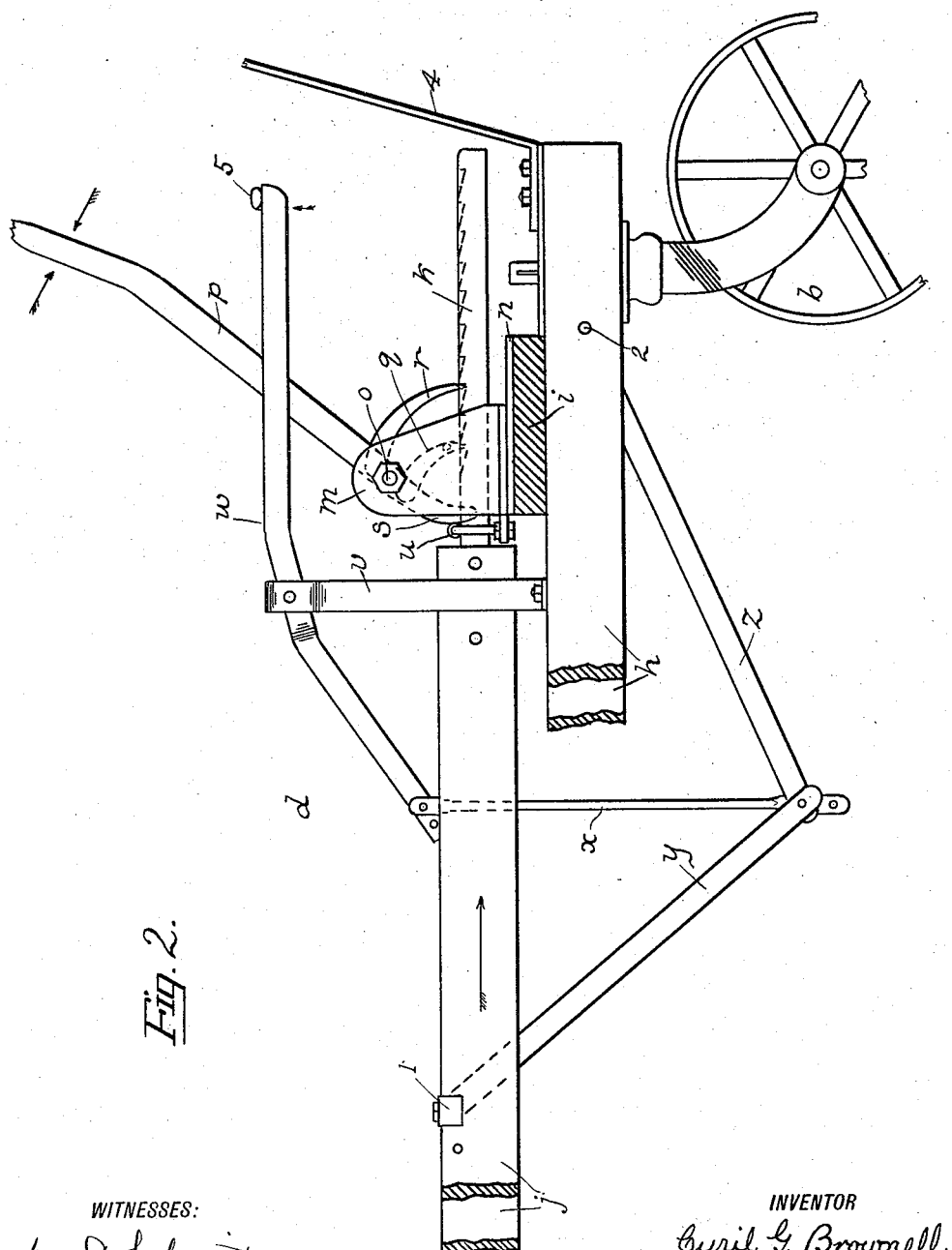

I attain my objects in the mechanism illustrated in the accompanying drawings, in which:

Figure 1 is a side elevation of a buck rake embodying my invention, full lines showing the positions assumed by the various parts when the rake teeth are in their operative or bucking position, and the dotted lines showing the arrangements of these parts when the rake is not bucking; Fig. 2 is a side elevation showing the details of the mechanism comprising my invention. In this illustration the rake teeth are supposed to be elevated as shown in the dotted lines of Fig. 1; Fig. 3 is a perspective view of the parts illustrated in Fig. 2, showing the lever in an inactive position, and the parts arranged as shown by the full lines of Fig. 1; and Fig. 4 is a detail of the double acting pawls and lever included in the operating means of my buck rake, also illustrating the position of the parts when the pawls are thrown out of engagement with the rack bar.

As shown in Fig. 1, the so-called "buck-rake" may be said to comprise a wheel mounted body, the front end of which is supported on the rake-frame $c$, including wheels $a$, such rake-frame being hinged to the vehicle body and adapted for movement in a vertical plane, and the rear end of the vehicle body being supported on a caster $b$. The rake-frame comprises cross-pieces $e$, $f$, connected by bars $f'$, and rigidly attached to the rake-frame are the forwardly projecting rake teeth $g$. The cross-bar $e$ of the rake-frame is hinged to the front ends of the thrust-bars $j$, which converge toward the rear end of the vehicle, and are pivotally connected to the rack-bar $k$. On the rear end of the vehicle body is provided a bearing plate $i$. A longitudinal movement of the thrust bars $j$ will tilt the rake teeth $g$ by causing the rake frame to rotate about the axle of the wheels $a$. The weight of the teeth $g$ is sufficient to hold them on the ground and thereby draw forward the thrust-bars $j$ and rack bar $k$ when these parts are not restrained by the controlling mechanism hereinafter described. The rack bar operates in a channel formed by a pair of side plates $m$ and a base plate $n$, the latter being fixed on the draw bar $i$. A shaft $o$, journaled in the plates $m$ rotatably supports the operating lever upon which are affixed the pawls $q$ and $r$ engaging with the rack bar $k$. Said pawls are so located with respect to the fulcrum of the lever that a forward thrust of the lever will cause the pawl $q$ to engage with and actuate the rack, and a return movement of the lever will cause the pawl $r$ to act in a similar manner. When both pawls are engaged with the rack, as shown in Fig. 2, the rack will be held stationary.

To release the pawls $q$, $r$, the bifurcated curved extremity $s$, of the lever $p$ is adapted to bear against pins $t$ (see Fig. 4) of the pawl $q$, thereby raising the latter, which in turn bears against the pawl $r$, and releases it. This action takes place when the lever is thrust to its extreme forward position as shown in Figs. 3 and 4. The lever-end $s$ normally pass between the sides of the rack bar $k$ and the plates $m$, coming into use by contact with the pins $t$ only when the lever is thrust forward as mentioned. A roller bearing $u$ is provided for the rack bar $k$ in order to prevent the latter from inadvertently rising into operative contact with the pawls $q$ and $r$.

Mounted on the reach bars $h$ (see Fig. 3), is a frame $v$, adapted to rotatably support a foot lever $w$. The latter connects with the toggle joint members $y$ and $z$ by means of a link $x$. A depression of the pedal end of the lever $w$ will actuate said toggle joint, thereby throwing the thrust-bars $j$ forward and causing the rake teeth to bear against the ground. The outer ends of the toggle joint member are pivotally fastened to the thrust-bars $j$ as shown at $l$ and the outer ends of the member $z$ are rotatably bolted to the reach-bars $h$, as shown at 2. The operator's seat 3 is mounted on a standard 4 at the extreme rear end of the thrust bars $h$, the operator riding with his feet on the pedals 5 of the lever $w$, throwing some of his weight thereon, thus forcing the rake teeth to bear closely on the ground.

In practice the rake is bucked under a windrow, the hay being piled up against the rear grating 6. When a sufficient load has been collected, the foot lever $w$ is released, and the lever $p$ thrown back and forth till the rake teeth $g$ have been elevated to their carrying position as shown in dotted lines $g'$ of Fig. 1. In this position, the hay is carried to the stacking place where it is unloaded. The method of unloading is accomplished by throwing forward the rear grating 6, after the teeth have been lowered. Said grating is thrust forward by the pulling back of the horses, but as this feature is well known, I have not described the details. The rake teeth $g$ are placed in operative position again by thrusting the lever $p$ forward, usually with the foot. This releases the rack bar $k$ as above described, and the weight of the teeth $g$ is sufficient to draw the thrust bars $j$ forward as shown in Figs. 1 and 3. Pressure on the pedal 5 of the lever $w$ operates the rod $x$ and toggle joint members $y$ and $z$, as indicated by the arrows in Fig. 3, and holds the thrust bars $j$ forward, thereby causing the teeth $g$ to remain close to the ground.

I claim:

In a buck-rake comprising a wheel-mounted body having hinged at the front end a rake-frame adapted for moving in a vertical plane, the combination of a longitudinally movable thrust-bar connected at its forward end to said rake-frame, for positioning the latter, a rack-faced member pivotally attached to said thrust-bar; means connected with the thrust-bar and operable for moving the same to its extreme forward position; means for drawing the thrust-bar rearward, and so holding the same, consisting of a lever the lower end of which is bifurcated, pawl-members pivoted in such bifurcated end one above the other and arranged for engaging with the rack-faced member, the lower of said pawls provided with lateral projections, and said bifurcated end of the lever having a portion underlying said projections so that the movement of said lever will cause the lower pawl to be lifted out of its engagement with the rack-faced member.

CYRIL G. BROWNELL.

Witnesses:
W. J. FERBRACHE,
EARL C. BROWNELL.